United States Patent
Fuh et al.

(10) Patent No.: US 8,972,403 B2
(45) Date of Patent: Mar. 3, 2015

(54) METHOD OF AND APPARATUS FOR ORGANIZING DATA RECORDS IN A RELATIONAL DATABASE

(75) Inventors: You-Chin Fuh, San Jose, CA (US); Ke Wei Wei, Beijing (CN); Xin Ying Yang, Beijing (CN); Jian Wei Zhang, Beijing (CN); Jing Zhou, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/365,394

(22) Filed: Feb. 3, 2012

(65) Prior Publication Data
US 2012/0221577 A1 Aug. 30, 2012

(30) Foreign Application Priority Data
Feb. 28, 2011 (CN) .......................... 2011 1 0051625

(51) Int. Cl.
*G06F 17/30* (2006.01)
*G06F 7/00* (2006.01)

(52) U.S. Cl.
CPC .............................. *G06F 17/30312* (2013.01)
USPC .......................... 707/737; 707/741; 707/742

(58) Field of Classification Search
CPC ................................................ G06F 17/30598
USPC .................................. 707/741, 736, 742, 737
See application file for complete search history.

(56) References Cited

U.S. PATENT DOCUMENTS

| | | | |
|---|---|---|---|
| 5,940,870 A * | 8/1999 | Chi et al. ....................... | 711/206 |
| 6,330,556 B1 | 12/2001 | Chilimbi et al. | |
| 6,598,069 B1 * | 7/2003 | Rooney et al. ................ | 718/104 |
| 6,633,817 B1 * | 10/2003 | Walker et al. .................. | 702/19 |
| 6,691,136 B2 | 2/2004 | Lee et al. | |
| 6,834,278 B2 * | 12/2004 | Yu et al. ......................... | 707/737 |
| 6,871,201 B2 * | 3/2005 | Yu et al. ......................... | 707/737 |
| 7,076,619 B2 * | 7/2006 | Hsu et al. ....................... | 711/158 |
| 7,251,376 B2 * | 7/2007 | Qian et al. ..................... | 382/253 |
| 7,360,043 B1 * | 4/2008 | Bonebakker .................. | 711/160 |
| 7,769,744 B2 * | 8/2010 | Waas et al. .................... | 707/711 |
| 2005/0234930 A1 * | 10/2005 | Hop Hing et al. ............ | 707/100 |
| 2007/0136238 A1 | 6/2007 | Bildhaeuser et al. | |
| 2009/0210445 A1 | 8/2009 | Draese et al. | |

FOREIGN PATENT DOCUMENTS

| | | |
|---|---|---|
| CN | 1764916 A | 4/2006 |
| CN | 1828556 A | 9/2006 |
| CN | 101101563 A | 1/2008 |

* cited by examiner

*Primary Examiner* — Pavan Mamillapalli
(74) *Attorney, Agent, or Firm* — Cantor Colburn LLP

(57) ABSTRACT

Embodiments of the invention relate to organizing data records in a relational database. An aspect of the invention includes creating index items for a plurality of data records. Each index item includes a counter and the creating results in a plurality of counters. The numerical values of counters in corresponding index items are updated for data records in the plurality of data records that are subjected to random access. The plurality of data records are reorganized based upon the numerical values of the plurality of counters.

12 Claims, 5 Drawing Sheets

METHOD OF AND APPARATUS FOR ORGANIZING DATA RECORDS IN A RELATIONAL DATABASE

The present application claims priority to Chinese Application No. 201110051625.7, filed on Feb. 28, 2011, and all the benefits accruing therefrom under 35 U.S.C. §119, the contents of which are herein incorporated by reference in its entirety.

BACKGROUND

The present invention generally relates to the processing of data records, and more particularly, to organizing data records in a relational database.

Many data management systems have been developed to effectively access and organize data records. Among these data management systems, relational databases are one of the dominant data management systems in enterprise markets. With an ever increasing amount of data to be stored and accessed, performance requirements become higher and higher on relational databases.

For example, a large bank that provides bank cards to its customers would typically have one or more computer application programs for supporting bank card servicing. Because numerous customers use bank cards, the bank's relational database may have to process millions of online transactions each day, for example, to query and update account information. Upon analysis of these transactions, the performance bottleneck of a relational database may be a synchronized input/output (I/O) operation when account information is loaded into a memory (also called buffer pool). One way to reduce the impact of this type of performance bottleneck is improve the hit rate of the buffer pool so as to enhance the efficiency of data access.

In addition, data is typically organized into data pages and though random data access often only needs to read or write one data record, the relational database has to load the entire data page into the buffer pool. Thus, it is possible that large portions of memory are assigned to non-frequently-accessed data records or data records that will not be accessed, thus resulting in a waste of space in the buffer pool, and therefore a lower buffer pool hit rate.

In order to improve the hit rate of the buffer pool, several approaches have been used.

A first approach is to use a data pre-fetch mechanism which pre-loads required data records into the buffer pool. This approach requires knowledge of a next access pattern in advance and in an application such as the bank example above, a next data access behavior is not predictable. Thus, the use of a data pre-fetch mechanism typically does not result in an increase in performance for applications that have unpredictable data access behaviors, or that perform random data accesses.

Another approach is to increase the buffer pool size or to optimize the buffer pool. By increasing the size of the buffer pool in which data records are loaded, more data records may be kept in the memory. However, this solution has a high cost, and it is generally impractical given typical memory constraints to obtain an amount of memory in the buffer pool that is identical to or close to the size of a data table. The buffer pool may be optimized, for example, by automatically setting a buffer pool size based on a historical buffer pool hit rate trend (see, for example, U.S. Patent Pub. No. 2002/0046204, entitled "Heuristic Automated Method for Ideal Buffer Pool Tuning in a Computer Database" by Hayes; and U.S. Pat. No. 7,512,591 entitled "System and Method to Improve Processing Time of Database by Cache Optimization" by Bildhaeuser et al.) and compressing the data records in the buffer pool to reduce memory utilization. One drawback to these optimization solutions is that they do not directly address the nature of random data access, i.e., the poor predictability.

A further approach to improving the hit rate of the buffer pool is to change the data structure. For example, some applications archive infrequently used data records into an archive table. A drawback to this solution is that it requires significant changes to the application. Meanwhile, batch processes, such as generating a report, may become more complex because data is distributed into multiple tables which makes application logic more complex to control.

A further approach to improving the hit rate of the buffer pool is to organize data records in a manner similar to that used by a file system or an operating system. For example, frequently used data is stored in a fast storage device. A drawback to this approach is that data organization in a relational database is stored in the order of a clustering index and organizing the data in a manner similar to that used by a file system or an operating system affects both the sequential access and insert performance of the data records in the database.

SUMMARY

Embodiments include a method, system, and computer program product for organizing data records in a relational database. Index items are created for a plurality of data records. Each index item includes a counter and the creating results in a plurality of counters. The numerical values of counters in corresponding index items are updated for data records in the plurality of data records that are subjected to random access. The plurality of data records are reorganized based upon the numerical values of the plurality of counters.

BRIEF DESCRIPTION OF THE SEVERAL VIEWS OF THE DRAWINGS

Features, advantages, and other aspects of various embodiments of the present invention will become more apparent through the following detailed description with reference to the following drawings, where in the drawings.

DETAILED DESCRIPTION

Embodiments of the present invention provide an improved buffer pool hit rate in a relational database system without affecting the performance of sequential data accesses and data record insert operations. Based on monitoring the number of random accesses to the data records and analyzing historical data about the number of random accesses, data records are partitioned into different physical partitions. Embodiments allow for the efficient storage of data records and an improvement in the hit rate of the buffer pool, without affecting a clustering property of the data records. In an embodiment, a counter is added into an index item that it used for randomly accessing data records. The counters are used for counting the random access behavior while random access is performed to data records, and the data records are reorganized based upon numerical values of the counters of the records.

Figure 3:
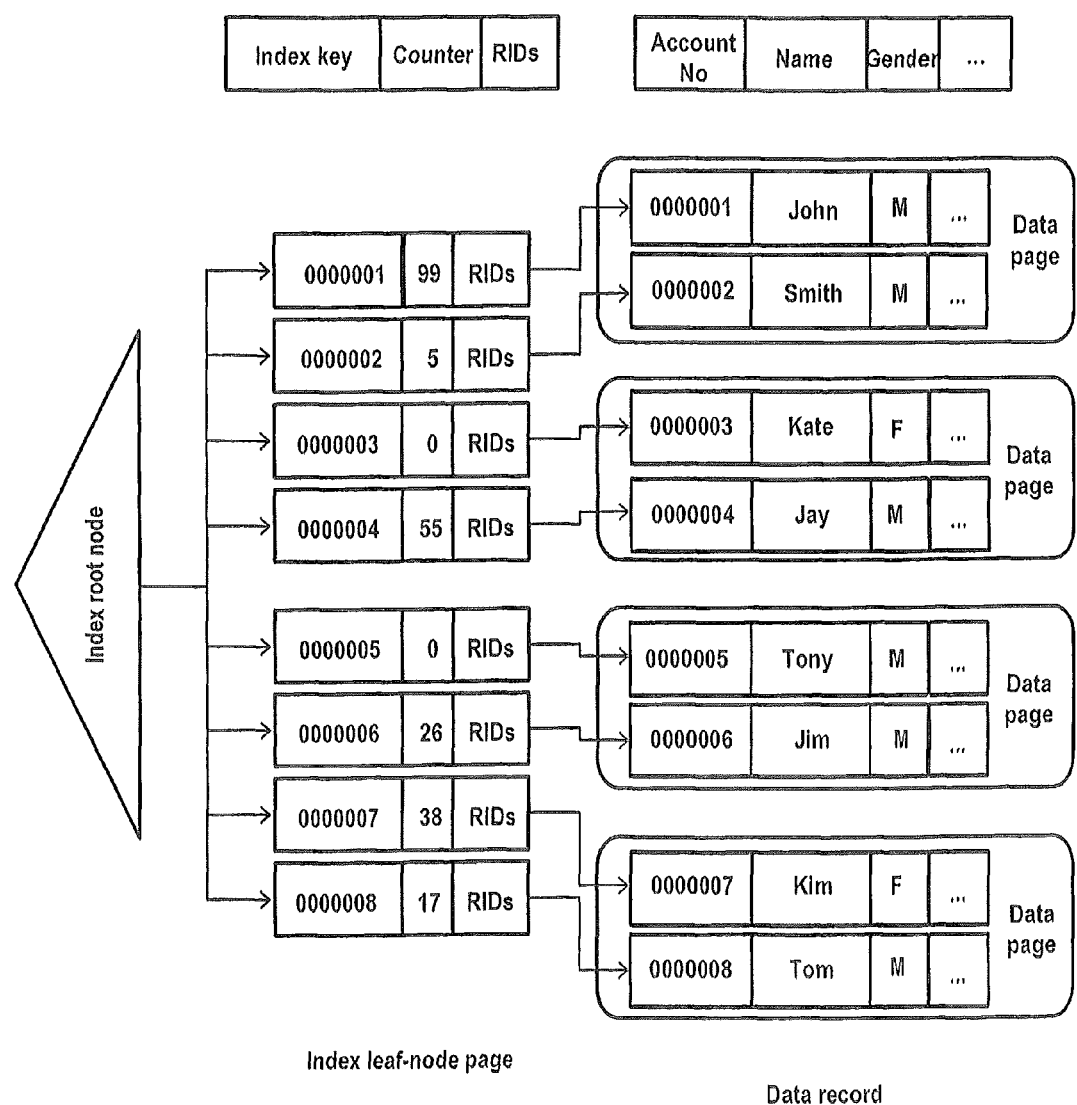
FIG. 3 schematically illustrates a diagram of updating a counter in an index item according to an embodiment.

In various embodiments, data records represent structured data items that are stored in the data pages (for example, each piece of account information in the data pages as illustrated in FIG. 3, which will be described later). As used herein, the term "random access behavior" generally means that no correlation exists among a plurality of access behaviors (for example, querying, updating, or deleting, etc.) to a database within a certain period of time; thus, it is hard for the database to predict which data records will be accessed next time. Such random access behavior is different from a sequential access behavior to the database. As used here, the term "sequential access behavior" generally means that a correlation exists among a plurality of access behaviors. For example, for an operation of accessing reports in a database in a particular sequence, the database may predict which data records will be accessed in the future based upon such a sequence and then may perform a pre-fetch operation.

Embodiments distribute various data records to different physical partitions based upon the historical number of random accesses to respective data records. For example, the data records that are frequently subjected to random access are stored in the same or successive data pages, such that the hit rate of the buffer pool may be effectively improved when they are loaded into the buffer pool together. Meanwhile, because the clustering nature of data records is considered when distributing them to different physical partitions, the operating performance of operations such as sequential access and data record insertion will not be affected.

The flowcharts and block in the figures illustrate the system, methods, as well as architecture, functions and operations executable by a computer program product according to the embodiments. In this regard, each block in the flowcharts or block diagram may represent a module, a program segment, or a part of code, which contains one or more executable instructions for performing specified logic functions. It should be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Figure 1:
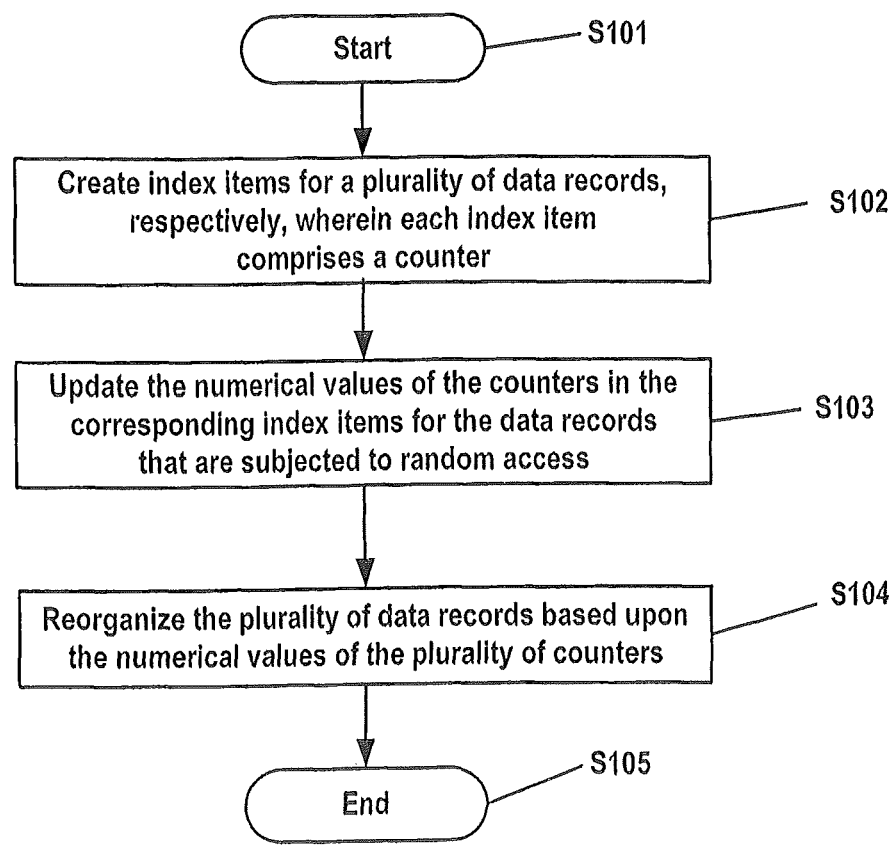
FIG. 1 schematically illustrates a flowchart of a method of organizing data records in a relational database according to an embodiment.

FIG. 1 schematically illustrates a flow chart of a method 100 of organizing data records in a relational database according to an embodiment. As illustrated in FIG. 1, the method 100 starts at block S101. At block S102, the method 100 creates index items for a plurality of data records, respectively, where each index item includes a counter. Hereinafter, specific operations of this block will be described in detail.

In various embodiments, creating an index item may be regarded as defining a random access behavior. Using the bank card application as described previously, a customer's access to the account information (namely, a specific data record) may be performed through an index defined with respect to "account number." For example, for a table entitled "ACCOUNT_INFO" that is defined with respect to the account information, its creation may be expressed as below:

```
CREATE TABLE "ACCOUNT_INFO" (
AccountNo INT,
Name VARCHAR(20),
Gender CHAR (1),
OpenDate Date,
. . . )
```

A clustering index as defined on the "ACCOUNT_INFO" is "IX_ACCOUNT_NO," and its creation may be expressed as below:

```
CREATE INDEX "IX_ACCOUNT_NO" on "ACCOUNT_INFO"(
AccountNo,
Name)
```

If the random access behavior to this data record is defined as obtaining a data record based upon "AccountNo," then the query clause may be expressed as below:
SELECT . . . FROM ACCOUNT_INFO WHERE AccountNo=?

Next, the random access behavior to data records may be modeled as equal matching index access through "IX_ACCOUNT_NO" having a matching column ("MATCHCOL" for short). For example, the clause "RANDOM ACCESS WITH MATCHCOL=1" may be used for specifying this behavior. When the access behavior to the data records matches the MATCHCOL with the number being 1, it is deemed that the access to data records at this time is a random data access. Creating an index item having this clause may be expressed as below:

```
CREATE INDEX "IX_ACCOUNT_NO" on "ACCOUNT_INFO"(
AccountNo,
Name)
RANDOM ACCESS WITH MATCHCOL=1
```

Figure 2:
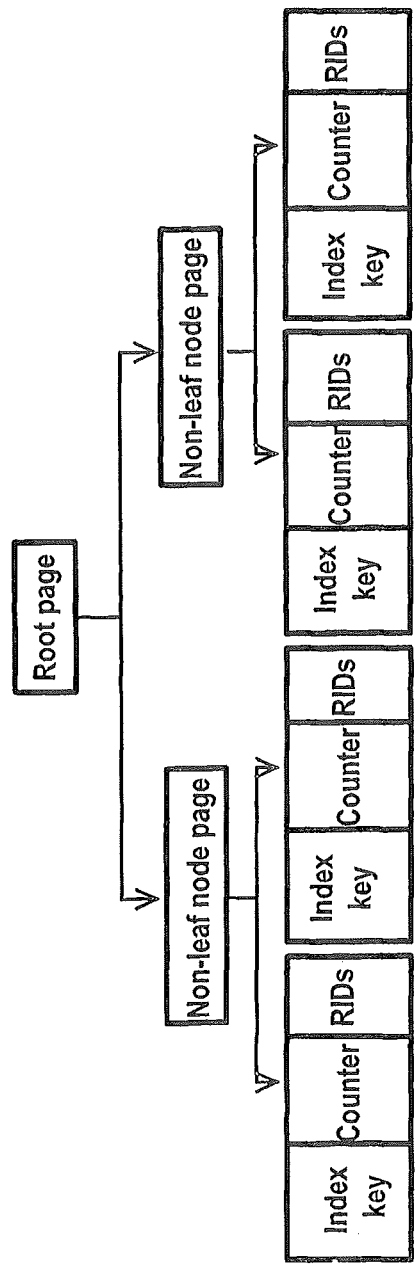
FIG. 2 schematically illustrates an index structure formed according to an embodiment.

It will be appreciated that the predetermined restriction condition clause "RANDOM ACCESS WITH MATCHCOL=1" is only illustrative, and those skilled in the art may predetermine other restriction condition clauses as required. For example, the above MATCHCOL may be modified to be greater than 1. For example, it may be equal to 2. In the case that the number of MATCHCOL is equal to 2, if the access behavior to the data records matches two columns (for example, the AccountNo and Name columns in sequence), this access behavior to the data records is deemed as random access behavior, instead of a sequential data access. Thus, a counter is added to an index item that is not provided with a counter based upon the predetermined restriction condition for the random access. The index structure added with the counter is schematically illustrated in FIG. 2 (described later herein).

After performing block S102, the method 100 advances to block S103. At block S103, the method 100 updates the numerical value of the counter in a corresponding index item for the data records subjected to random access. Hereinafter, specific operations of block S103 will be illustratively described.

When the user is initiating an access to a data record, for example, querying the data record using the above query clause including the predication "WHERE AccountNo=?," the optimizer in the relational database selects an index for this access behavior (namely, an index including the index item as created above) and determines whether this index access behavior satisfies the predetermined number of MATCHCOLs. If this index access behavior satisfies the predetermined number of MATCHCOLs, for example the number of equal MATCHCOLs is greater than or equal to 1, then the optimizer believes that the access to the data records at this time is a random data access through the equal matching index access, and it increases the numerical value of the counter in the corresponding index item by 1. FIG. 3 (described later herein) schematically illustrates the counter update situations in respective index items of a plurality of data records after multiple times of random access to data records occur.

After performing block S103, the method 100 advances to block S104. In block S104, the method 100 reorganizes a plurality of data records based upon numerical values of a plurality of counters. The operation of reorganizing the plurality of data records is described below in reference to FIG. 4.

After reorganizing the plurality of data records, the method 100 ends at block S105.

FIG. 2 schematically illustrates an index structure formed according to an embodiment. As illustrated in FIG. 2, the index structure comprises a root page (also called a root node page), two non-leaf node pages, and four index items (stored in the index leaf node pages). Each index item as illustrated in FIG. 2 includes an index key, an added counter, and a row identifier (RID). As known to those skilled in the art, an index item of a relational database includes an index key and RID, where the index key may be "AccountNo" as mentioned above, while the RID indicates the actual physical storage location of a data record, which is not expressed in the clause CREATE INDEX "IX_ACCOUNT_NO" as mentioned above. Instead, by adding a restriction condition clause as mentioned above, the present invention adds a counter in these four index items, respectively. Although only two non-leaf node pages and four index items are illustrated here, those skilled in the art would appreciate that various changes may be made in number and node arrangement of an actual index structure without departing from the spirit and scope of the embodiments of the present invention.

FIG. 3 schematically illustrates a diagram of updating a counter in an index item according to an embodiment. As illustrated in FIG. 3, the index root node includes eight index items that are stored in the index leaf node pages, with each index item including an index key, a counter, and a row identifier. Here, the index key is illustratively set to be the account number, while each index item points toward a data record that is stored in the data pages. The data record illustratively includes the account number, name, and gender, etc. For simplicity, FIG. 3 omits non-leaf node pages that exist between the index root node and the index leaf node pages (as illustrated in FIG. 2). Additionally, index items, data pages, and the number of data records in the data pages are also merely illustrative. The actual index structure and the data records may be more complex and have more numbers than what is illustrated here.

From FIG. 3, it is seen that in the index item with the index key being "0000001," the numerical value of the counter that records the number of times of random access is 99, which indicates that within a predetermined time interval (for example, one week or one month), the data records of a male customer with the account number (namely, index key) being "0000001" and a name of "John" have been subjected to 99 random accesses. Also shown in the data records of FIG. 3 is that the male customer with the account number being "0000002" and a name of "Smith," which are stored in the same data page as the data records with the account number "0000001," have been subjected to 5 random accesses.

Likewise, in the index item with an account of "0000003," the numerical value of the counter is 0, which indicates that within the same predetermined time interval as other index items, the data records of the female customer with an account number of "0000003" and a name of "Kate" have not been subjected to random access (e.g., query or update operations with respect to the account number), while the data records of a male customer with an account number being "0000004" and a name "Jay," which are stored in the same data page as the data records of the female customer "Kate," have been subjected 55 times to a random access.

From FIG. 3, it may be seen that the data records of the account number "0000003" that are not subjected to random access and the date records of the account number "0000004" that are subjected to frequent random access are stored in a same data page. When the data records of the account number "0000004" are subjected to random access, the data records of the account number "0000003," which are not subjected to random access, are also loaded into the buffer pool. When a similar case occurs for a large number of data pages, it will undoubtedly cause considerable waste of buffer pool space; and thus, it is necessary to reorganize the stored data records.

Figure 4:
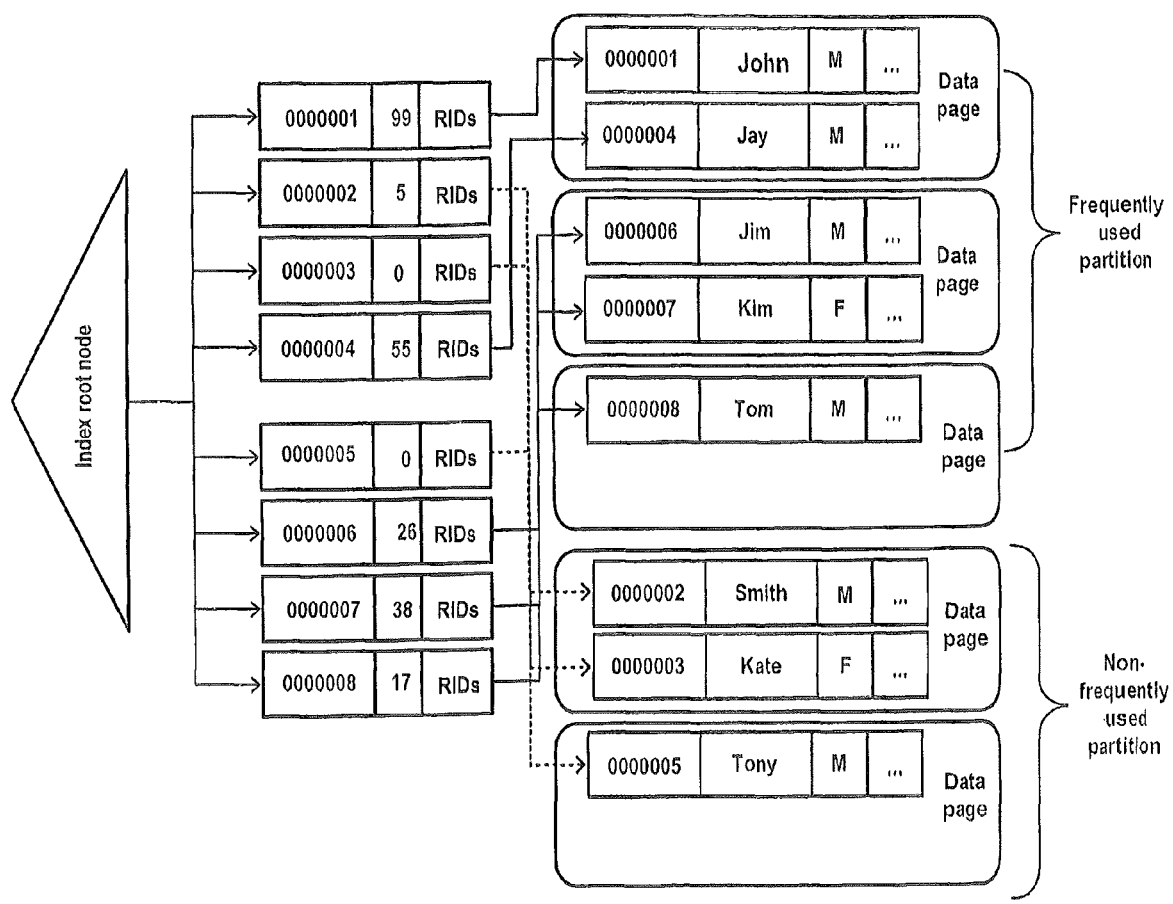
FIG. 4 schematically illustrates a diagram of reorganizing a plurality of data records based upon numerical values of counters in index items according to an embodiment.

FIG. 4 schematically illustrates a diagram of reorganizing a plurality of data records based upon the values of the counters in the index items according to an embodiment. Different from the data pages in FIG. 3, the plurality of data pages in FIG. 4 are classified into non-frequently used partitions and frequently used partitions. The data records subjected to more frequent random access are stored in the frequently used partitions, while the data records subjected to fewer random accesses or even subjected to no random access are stored in the non-frequently used partition. For example, since the data records of the account numbers "0000001," "0000004," and "0000008" are subjected to 99, 55, and 17 random accesses respectively within a same predetermined time internal, these data records are reorganized to a plurality of data pages that belong to the frequently used partitions. Similarly, since the data records of the account numbers "0000002," "0000003," and "0000005" are only subjected to 5, 0, and 0 times of random access respectively, these data records are reorganized to a plurality of data pages that belong to non-frequently used partitions.

Although updating of numerical values of a plurality of counters has been illustrated herein with a predetermined time interval as an example, those skilled in the art would, according to the embodiments of the present invention, will envision archiving the numerical values of the plurality of counters regularly or when the numerical values of the counters reach a predetermined threshold, so as to reorganize the plurality of data records into different physical partitions based upon the historical numerical values of the plurality of counters. In an embodiment, the numerical values of respective counters are cleared off after being saved each time, for continuing implementation of subsequent counting operations.

Further, although the physical partitions are divided into a frequently used partition and a non-frequently used partition in FIG. 4, such dividing is only illustrative, and those skilled in the art may also employ other dividing manners. For example, the physical partitions may be divided into three parts, i.e., frequently used partition, non-frequently used partition, and an intermediate partition between the frequently used partition and non-frequently used partition, respectively; further, different thresholds for the numerical values of the counters are set for the three partitions, respectively. For example, when the number of random accesses to a data record (or accumulated times) is greater than 100, then the data record is reorganized into the frequently used partition; while if the times of random access to the data record is between 100 and 50, then the data record is reorganized into the intermediary partition, and if the number of times of random access to the data record is less than 50, then the data record is reorganized into the non-frequently used partition.

Further, according to an embodiment of the present invention, percentages may be partitioned for a plurality of partitions, for example, sorting respective data records based upon the numerical values of the counters or the numerical values that are accumulated for many times (i.e., historical numerical values), and then 30% of the data records that are subjected to the most times of random access are reorganized into the frequently used partition, and 30% of the data records that are subjected to fewest times of random access are reorganized into non-frequently used partition, and the remaining 40% of the data records whose number of times of random access is in the middle are reorganized into the intermediate partition.

Besides reorganizing data records based upon at least one threshold of a plurality of counters and at least one allocation proportion for numerical value ranges of a plurality of counters, embodiments of the present invention may also reorganize a plurality of data records by using a suitable clustering algorithm. An example clustering algorithm is a K-means algorithm, such as that described in "A K-Means Clustering Algorithm" by J. A. Hartigan and M. A. Wong, Applied Statistics, vol. 28, issue 1, pages 100-108.

From FIG. 4, it may be seen that the data records stored in the frequently used partition and non-frequently used partition still maintain the nature of the clustering index. For example, in the frequently used and non-frequently used partitions as illustrated, each data record is still stored in respective data pages in the order of account numbers. Thus, although respective data records are reorganized according to various embodiments of the present invention, the clustering index nature of data records will not be affected, and thus the sequential access operation and insertion operation as performed on these data records will not be affected either.

Figure 5:
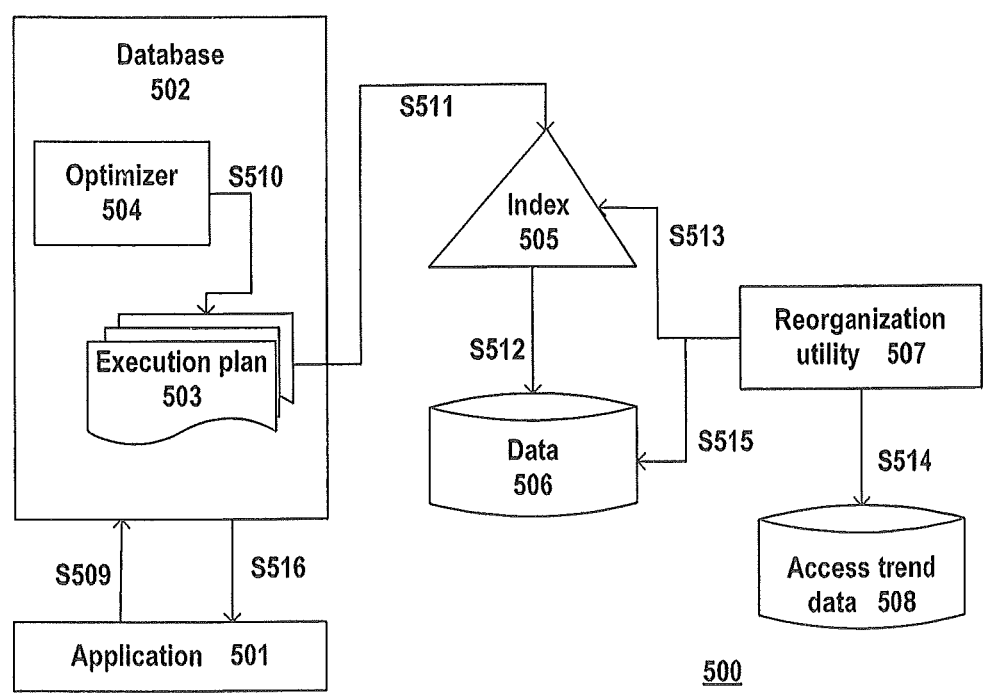
FIG. 5 schematically illustrates a structural diagram of a system for organizing data records in a relational database according to an embodiment.

FIG. 5 schematically illustrates a structural diagram of a system 500 for organizing data records in a relational database according to an embodiment of the present invention. As illustrated in FIG. 5, the system 500 includes an application 501, a relational database 502 that includes an execution plan 503 and an optimizer 504, an index 505 that includes a plurality of index items, data 506 including a plurality of data records, a reorganization utility 507, and access trend data 508. In an embodiment, the index 505 is pre-created through index creating means (not shown). In another embodiment, the index 505 is formed by modifying a previously created index item (for example, adding a counter). Hereinafter, the operation process of the system 500 is described in more detail.

When the application 501 initiates an access to the relational database 502 at block S509 (for example, the bank card application as mentioned above), the optimizer 504 may identify whether this data access is a random access at bind time. If this data access is through equal matching index access and the matching columns are equal to the predetermined columns, for example, the MTCHCOL being equal to 1 as illustratively described in FIG. 1, then the optimizer 504 deems that the access of this time is a random access to a data record, and it will create a corresponding one or more execution plans 503 at block S510. The execution plan 503 includes an operation on the data record access and an updating operation on the counters included in the index items. In an embodiment, the execution plan 503 includes index updating means (not shown), for updating the numerical values of the counters of the index items in the corresponding index 505 for the data record that is subjected to random access.

Next, when the application 501 invokes the relational database 502 to execute the execution plan at block S511, the counter in the corresponding index item in the index 505 is updated, i.e., increasing the value of the counter by 1. Because various embodiments may reorganize the data records based upon the long term historical data of the numerical values of the counters, it is not necessary to guarantee through a locking operation that the numerical values of the counters are totally accurate. Next, at block S512, the relational database 502 obtains the required data records from the data 506 including a plurality of data records through a corresponding index item in the index 505, and returns the required data to the application 501 at block S516. The application 501 returns corresponding results sets to the customer after obtaining the required data records.

The reorganization utility 507 (for example, it may be implemented by reorganizing means) in the system 500 may access counters in a plurality of index items at block S513; therefore, it may obtain the numerical values of counters in respective index items regularly or when the numerical values of the counters reach predetermined thresholds (as depicted with reference to FIG. 1), and save the numerical values of the plurality of counters at block S514 to form access trend data 508. Next, the reorganization utility 507 reorganizes the plurality of data records in the data 506 at block S515 based upon the numerical values of respective counters in the access trend data 508, for example, dividing the plurality of data records according to predetermined thresholds or percentages as previously mentioned, such that the data records that are subjected to frequent random access are reorganized into same data pages or data pages close to each other, and meanwhile, because the reorganization utility 507 reorganizes data records in the clustering index manner, the sequential data access and insertion operations on the reorganized data records will not be affected.

Although the operation of the system 500 is illustrated by a plurality of unidirectional arrows for simplifying the drawings, those skilled in the art would readily appreciate that the unidirectional arrows here do not merely represent unilateral operations of individual entities, but also relate to bidirectional interoperations among a plurality of entities, for example, returning data records from the data 506 to the relational database 502, etc.

Through the above detailed description, those skilled in the art would appreciate that the present invention may adopt a form of fully hardware embodiment, fully software embodiment or an embodiment comprising hardware components and software components. In a preferred embodiment, the present invention is implemented as software, including but not limited to, firmware, resident software, micro-code, etc.

Moreover, the present invention may be implemented as a computer program product usable from computers or accessible by computer-readable media that provide program codes for use by or in connection with a computer or any instruction executing system. For the purpose of description, a computer-usable or computer-readable medium may be any tangible means that can contain or store the program for use by or in connection with an instruction execution system, apparatus, or device.

The medium may be an electric, magnetic, optical, or semiconductor system (apparatus or device). Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-R/W), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An input/output (I/O) device (including, but not limited to a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

The invention claimed is:

1. A method of organizing data records in a relational database, the method comprising:
    creating, by a computer, respective index items for a plurality of data records in the relational database, each index item comprising a definition of a random access based on a field of the data record that is listed in the index item for the index item's respective data record, and a respective counter, the creating resulting in a plurality of counters;
    incrementing, by the computer, a numerical value of a counter in a corresponding index item for each data record in the plurality of data records that is subjected to a random access based on the field that is listed in the definition of random access for the data record in the data record's respective index item; and
    reorganizing, by the computer, the plurality of data records based upon the numerical values of the plurality of counters into corresponding physical partitions in the relational database, the corresponding physical partitions comprising a first physical partition storing a first plurality of the data records having counters with numerical values above a first threshold, and a second physical partition storing a second plurality of the data records having counters with numerical values below a second threshold, the second threshold being lower than the first threshold; and
    wherein the first plurality of data records are ordered based on a clustering index within the first physical partition, and wherein the second plurality of data records are ordered based on the clustering index within the second physical partition.

2. The method according to claim 1, further comprising adding a counter into an index item that is not provided with a counter based upon a predetermined restriction condition for the random access, wherein the predetermined restriction condition is defined in the index item and comprises a minimum number of columns of the data record that are matched by an access to the data record, and wherein the counter is incremented based on an access to the data record matching a number of columns of the data record that is greater than or equal to the minimum number of columns.

3. The method according to claim 1, wherein the reorganizing the plurality of data records based upon the numerical values of the plurality of counters comprises archiving the numerical values of the plurality of counters regularly so as to reorganize the plurality of data records based upon historical numerical values of the plurality of counters.

4. The method according to claim 1, wherein the reorganizing the plurality of data records based upon the numerical values of the plurality of counters comprises archiving the numerical values of the plurality of counters in response to the numerical values of the plurality of counters reaching predetermined thresholds, so as to reorganize the plurality of data records based upon historical numerical values of the plurality of counters.

5. A system for organizing data records in a relational database, the system comprising a processor configured to perform a method comprising:
    creating, by a computer, respective index items for a plurality of data records in the relational database, each index item comprising a definition of a random access based on a field of the data record that is listed in the index item for the index item's respective data record, and a respective counter, the creating resulting in a plurality of counters;
    incrementing, by the computer, a numerical value of a counter in a corresponding index item for each data record in the plurality of data records that are is subjected to a random access based on the field that is listed in the definition of random access for the data record in the data record's respective index item; and
    reorganizing, by the computer, the plurality of data records based upon the numerical values of the plurality of counters into corresponding physical partitions in the relational database, the corresponding physical partitions comprising a first physical partition storing a first plurality of the data records having counters with numerical values above a first threshold, and a second physical partition storing a second plurality of the data records having counters with numerical values below a second threshold, the second threshold being lower than the first threshold; and
    wherein the first plurality of data records are ordered based on a clustering index within the first physical partition, and wherein the second plurality of data records are ordered based on the clustering index within the second physical partition.

6. The system according to claim 5, wherein the method further comprises adding a counter into an index item that is not provided with a counter based upon a predetermined restriction condition for the random access, wherein the predetermined restriction condition is defined in the index item and comprises a minimum number of columns of the data record that are matched by an access to the data record, and wherein the counter is incremented based on an access to the data record matching a number of columns of the data record that is greater than or equal to the minimum number of columns.

7. The system according to claim 5, wherein the reorganizing the plurality of data records based upon the numerical values of the plurality of counters comprises archiving the numerical values of the plurality of counters regularly so as to reorganize the plurality of data records based upon historical numerical values of the plurality of counters.

8. The system according to claim 5, wherein the reorganizing the plurality of data records based upon the numerical values of the plurality of counters comprises archiving the numerical values of the plurality of counters in response to the numerical values of the plurality of counters reaching predetermined thresholds, so as to reorganize the plurality of data records based upon historical numerical values of the plurality of counters.

9. A computer program product for organizing data records in a relational database, the computer program product comprising a computer readable storage medium having computer readable program code embodied therewith, the computer readable program code comprising computer readable computer code configured for:

creating, by a computer, respective index items for a plurality of data records in the relational database, each index item comprising a definition of a random access based on a field of the data record that is listed in the index item for the index item's respective data record, and a respective counter, the creating resulting in a plurality of counters;

incrementing, by the computer, a numerical value of a counter in a corresponding index item for each data record in the plurality of data records that is subjected to a random access based on the field that is listed in the definition of random access for the data record in the data record's respective index item; and reorganizing, by the computer, the plurality of data records based upon the numerical values of the plurality of counters into corresponding physical partitions in the relational database, the corresponding physical partitions comprising a first physical partition storing a first plurality of the data records having counters with numerical values above a first threshold, and a second physical partition storing a second plurality of the data records having counters with numerical values below a second threshold, the second threshold being lower than the first threshold; and wherein the first plurality of data records are ordered based on a clustering index within the first physical partition, and wherein the second plurality of data records are ordered based on the clustering index within the second physical partition.

10. The computer program product of claim 9, wherein the computer readable program code is further configured for adding a counter into an index item that is not provided with a counter based upon a predetermined restriction condition for the random access, wherein the predetermined restriction condition is defined in the index item and comprises a minimum number of columns of the data record that are matched by an access to the data record, and wherein the counter is incremented based on an access to the data record matching a number of columns of the data record that is greater than or equal to the minimum number of columns.

11. The computer program product of claim 9, wherein the reorganizing the plurality of data records based upon the numerical values of the plurality of counters comprises archiving the numerical values of the plurality of counters regularly so as to reorganize the plurality of data records based upon historical numerical values of the plurality of counters.

12. The computer program product of claim 9, wherein the reorganizing the plurality of data records based upon the numerical values of the plurality of counters comprises archiving the numerical values of the plurality of counters in response to the numerical values of the plurality of counters reaching predetermined thresholds, so as to reorganize the plurality of data records based upon historical numerical values of the plurality of counters.

* * * * *